United States Patent
Hamilton (10) Patent No.: US 12,499,062 B2
(45) Date of Patent: Dec. 16, 2025

(54) SYSTEMS AND METHODS OF I/O DEVICE EMULATION FOR INDUSTRIAL SYSTEMS

(71) Applicant: ROCKWELL AUTOMATION TECHNOLOGIES, INC., Mayfield Heights, OH (US)

(72) Inventor: Philip M. Hamilton, Bettendorf, IA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 148 days.

(21) Appl. No.: 18/223,458

(22) Filed: Jul. 18, 2023

(65) Prior Publication Data
US 2025/0028656 A1  Jan. 23, 2025

(51) Int. Cl.
*G06F 13/10* (2006.01)

(52) U.S. Cl.
CPC ........ *G06F 13/105* (2013.01); *G06F 2213/40* (2013.01)

(58) Field of Classification Search
CPC .............................. G06F 15/00; G06F 3/04842
See application file for complete search history.

(56) References Cited

U.S. PATENT DOCUMENTS

| | | | |
|---|---|---|---|
| 2014/0046618 A1* | 2/2014 | Arunachalam | G05B 19/0428 702/127 |
| 2014/0180644 A1* | 6/2014 | Maturana | G05B 19/05 703/1 |
| 2016/0182323 A1* | 6/2016 | Ferguson | H04L 43/045 709/224 |
| 2016/0330082 A1* | 11/2016 | Bliss | G06F 3/04842 |
| 2017/0205780 A1* | 7/2017 | Grgic | G05B 17/02 |
| 2017/0205811 A1* | 7/2017 | Grgic | G05B 19/05 |

* cited by examiner

*Primary Examiner* — Getente A Yimer
(74) *Attorney, Agent, or Firm* — Quarles & Brady LLP (57) ABSTRACT

Systems and methods for providing automated input/output (I/O) device emulation for industrial systems. One configuration provides a system including an electronic processor configured to detect a presence of an industrial device of an industrial system. The electronic processor may be configured to detect an incompatibility between the industrial device and a list of industrial devices included in the industrial system. The electronic processor may be configured to reconcile the incompatibility between the industrial device and the list of industrial devices included in the industrial system to set an emulation mode for the industrial device. The electronic processor may be configured to control the industrial device in accordance with the emulation mode such that the industrial device emulates another industrial device included in the list of industrial devices included in the industrial system.

17 Claims, 8 Drawing Sheets

SYSTEMS AND METHODS OF I/O DEVICE EMULATION FOR INDUSTRIAL SYSTEMS

CROSS-REFERENCES TO RELATED APPLICATIONS

Not applicable.

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

Device emulation generally refers to mimicking or duplicating another device, including, e.g., behavior of functionality of that other device. For instance, a first hardware device may emulate a second hardware device, such that the first hardware behaves or functions as if the first hardware device was the second hardware device. In some cases, device emulation may be utilized when replacing a predecessor (or legacy) hardware device with a new or replacement hardware device.

Some approaches to introducing new or replacement hardware device may include, e.g., the new hardware device emulating a predecessor device (e.g., the hardware device to be replaced by the new hardware device). Such approaches may involve a skilled user using a computing device with legacy software or a dedicated terminal device to configure an emulation mode for such device emulation situations (e.g., configuring a scan list, a remote device emulation, etc.), which results in various technical challenges and inefficiencies. For instance, not many users have the skills to configure the emulation mode. For example, when an inexperienced user tries to configure the emulation mode, there may be a high likelihood of that user to make mistakes that can disrupt the communication bus and take down a whole segment of an industrial system, which, ultimately, causes unscheduled downtime. Additionally, even when a user does have the skills, utilization of the legacy software imposes further challenges. Using legacy software generally introduces connectivity issues (e.g., establishing a substantial connection between the legacy software and an industrial device that may not be compatible with the legacy software), software maintenance issues (e.g., legacy software may not be maintained, up to date, etc.), and the like. Alternatively, or in addition, some approaches to introducing new hardware devices may result in downtime events, lost of production, service calls, etc., which, ultimately, impact the efficiency and performance of the underlying industrial system.

Accordingly, the technology disclosed herein provides automated input/output (I/O) device emulation. In particular, the technology disclosed herein includes systems and methods that facilitate automated I/O device emulation setup. In some configurations, the technology disclosed herein provides automated I/O device emulation setup by modifying the I/O device to match a scan list entry. Alternatively, or in addition, in some configurations, the technology disclosed herein provides automated I/O device emulation setup by modifying the scan list to match the I/O device, such as, e.g., by adding a scan list entry to the scan list for the I/O device.

The technology disclosed herein provides technical solutions to at least the technical problems described herein. For instance, the technology disclosed herein may reduce an amount of time associated with commissioning a device, which, ultimately, increases efficiency associated with the commissioning process (e.g., less time to reconcile device type). As another example, the technology disclosed herein may reduce errors associated with some approaches (e.g., a user selecting the wrong device), which, ultimately, increases accuracy and performance associated with the commissioning process and the industrial system. As yet another example, the technology disclosed herein may reduce, or remove, maintaining a computing device with legacy software, a legacy hardware interface, etc. Accordingly, in some examples, the technology disclosed herein may mitigate or eliminate disparate tools (e.g., legacy software and hardware), which, ultimately, may advantageously effect security, audits, recovery, etc. As yet another example, the technology disclosed herein may enable users having various skill levels perform tasks associated with the commissioning process (e.g., configuring an emulation mode), which may mitigate or remove human errors, thus reducing risks of communication bus disruptions, unscheduled downtime, etc. As yet another example, the technology disclosed herein may be implemented as a software update (e.g., a firmware update). As such, the technology disclosed herein may be implemented using existing hardware, which reduces overall costs and increases accessibility and modernization efforts.

Accordingly, configurations described herein provide systems and methods for automated I/O device emulation for industrial automation systems. One configuration provides a system for providing automated I/O device emulation for industrial systems. The system may include one or more electronic processors configured to detect a presence of an industrial device of an industrial system. The one or more electronic processors may be configured to detect an incompatibility between the industrial device and a list of industrial devices included in the industrial system. The one or more electronic processors may be configured to reconcile the incompatibility between the industrial device and the list of industrial devices included in the industrial system to set an emulation mode for the industrial device. The one or more electronic processors may be configured to control the industrial device in accordance with the emulation mode such that the industrial device emulates another industrial device included in the list of industrial devices included in the industrial system.

Another configuration provides a method for providing automated I/O device emulation for industrial systems. The method may include determining, with one or more electronic processors, whether a first industrial device is compatible with a second industrial device represented by a node of a scan list for the industrial system. The method may include, responsive to determining an incompatibility between the first industrial device and the second industrial device, reconciling, with the one or more electronic processors, the incompatibility between the first industrial device and the second industrial device to set an emulation mode for the first industrial device. The method may include controlling the first industrial device in accordance with the emulation mode such that the first industrial device emulates the second industrial device, wherein the second industrial device is a pre-existing industrial device included in the industrial system.

Yet another configuration provides a system for providing automated I/O device emulation within an industrial system. The system may include one or more electronic processors configured to detect a presence of an industrial device on a network associated with the industrial system. The one or more electronic processors may be configured to, responsive to an incompatibility between the industrial device and a scan list for the industrial system, transmit, to the industrial device, a message requesting device data for the industrial device, the device data including a device type of the industrial device; receive, from the industrial device, a response to the message, the response including the device data; generate a scan list entry for the industrial device using the device data; and update the scan list to include the scan list entry for the industrial device.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

As utilized herein, terms "component," "system," "controller," "device," "manager," "computer module," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

As noted herein, the technology described herein includes an automated I/O device emulation (e.g., automatically setting up I/O device emulation) by reconciling device type mismatches between a scan list and a target (or replacement) industrial device by, e.g., matching an industrial device to a scan list entry associated with a predecessor or legacy industrial device, modifying a scan list to include a scan list entry matching an industrial device, etc.

A scan list (or I/O tree) may include an entry for each node (e.g., each industrial device included in an industrial system), where each node may include information, such as, e.g., target network address, electronic keying, connection status, I/O details (Input/Output/Configuration), and device configuration data. Each target industrial device (or replacement device) may have an identity object, Input/output/configuration assemblies, and an parameter object. Automatic I/O emulation configuration logic may be triggered when a target node is present on the network but fails the electronic keying. The logic may send a message to the target node to determine the device identity to see if it is compatible with the electronic keying listed for that node.

In some examples, the technology disclosed herein provides automatic I/O emulation such that, when a replacement industrial device is present on a network of an industrial system and is capable of emulating a pre-existing industrial device included in the industrial system, the technology described herein may utilize a scan list entry (e.g., a scan list entry target device product code) for the pre-existing industrial device to set an emulation mode for the replacement device (e.g., set an emulation parameter of the replacement device). In such configurations, the technology disclosed herein may send a message to the parameter object of the replacement industrial device to set the emulation mode to match the electronic keying (in the scan list entry).

In some examples, the technology disclosed herein may provide automatic I/O emulation such that, when a replacement industrial device is present on a network of an industrial system and is compatible, but does not match a scan list entry, the technology described herein may utilize device data from the target device (or replacement device) to update the scan list entry (e.g., generating a new scan list entry for the replacement device using the device data from the target or replacement device). In such configurations, the technology disclosed herein may send a message to the parameter object of the replacement device, read a device data or hardware type (e.g., sensor module, control module, expansion I/O, operator station, etc.), and modify the scan list entry to match the target device (or replacement device).

Once the emulation mode is set in the target device, the technology disclosed herein may reset the replacement device such that the replacement industrial device reboots into the emulated state (in accordance with the set emulation mode), which may satisfy the electronic keying (where the device status may now indicate the node is present and the product code matches). Thereafter, the technology disclosed herein may enable or facilitate (automatic) device replacement by sending configuration assembly, starting the IO connection, etc.

Figure 1:
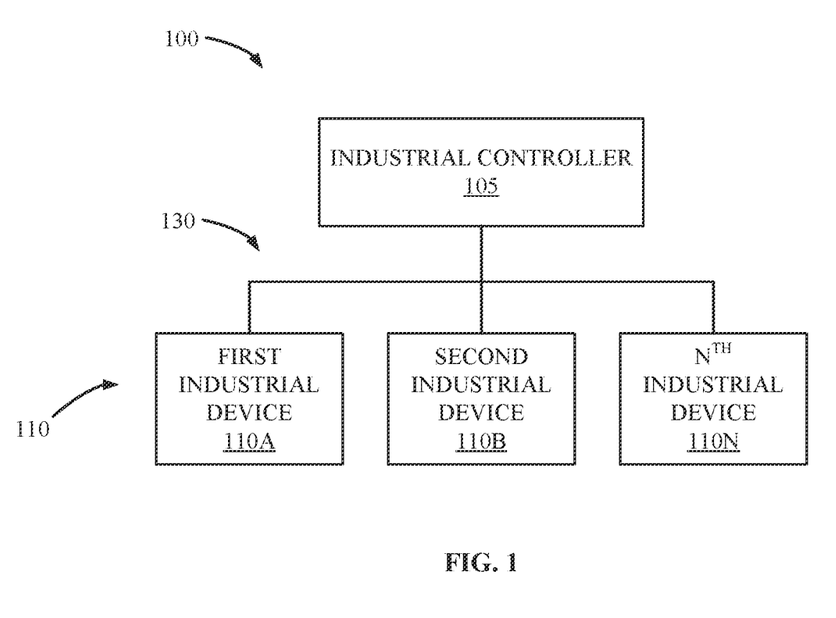
FIG. 1 schematically illustrates a system for providing automated I/O device emulation for industrial systems according to some configurations.

FIG. 1 schematically illustrates a system 100 for providing automated I/O device emulation according to some configurations. The system 100 may be an example of an industrial system. Accordingly, the system 100 may also be referred to herein as "the industrial system 100." The industrial system 100 may be a manufacturing system, such as, e.g., an industrial automation system or the like. The industrial system 100 may perform one or more industrial processes, manufacturing processes, production processes, or the like. In some configurations, the industrial system 100 may perform a production method that produces goods or products. As one example, the industrial system 100 may perform a vehicle manufacturing process to assemble or produce a vehicle (or various components thereof). As another example, the industrial system 100 may perform a food manufacturing process for making a food product.

In the illustrated example of FIG. 1, the industrial system 100 may include an industrial controller 105 and one or more industrial devices 110, including a first industrial device 110A, a second industrial device 110B, and an Nth industrial device 110N. In some configurations, the industrial system 100 includes fewer, additional, or different components in different configurations than illustrated in FIG. 1. As one example, the industrial system 100 may include multiple industrial controllers 105. As another example, one or more components of the industrial system 100 may be combined into a single device.

The industrial controller 105 and the industrial device(s) 110 may communicate over one or more communication networks 130. In some configurations, the communication network 130 may be a controller area network (CAN) bus. The one or more communication networks 130 may include a wired communication network, a wireless communication network, or a combination thereof. Portions of the communication networks 130 may be implemented using a wide area network, such as the Internet, a local area network, such as a WI-FI®, and combinations or derivatives thereof. Alternatively, or in addition, in some configurations, components of the industrial system 100 may communicate directly as compared to through the communication network 130. Also, in some configurations, the components of the industrial system 100 may communicate through one or more intermediary devices not illustrated in FIG. 1.

In some configurations, the industrial system 105 may represent an industrial subsystem. Accordingly, in some configurations, the industrial system 100 (or one or more components therein) of FIG. 1 may represent a section of an industrial system or industrial automation system. For example, the industrial system 105 may represent a workstation, a piece of equipment or machinery, a segment of an industrial system, or another component of an industrial system. The industrial system 100 of FIG. 1 may perform (or be associated with) one or more sub-processes of the industrial system.

The industrial device(s) 110 may be a physical piece of equipment included in the industrial system 100. For example, the industrial device 110 may include a pump, a press, a conveyor, an actuator, a valve, an additional industrial controller (e.g., a programmable logic controller ("PLC"), industrial compute module, network switch, and the like), a switch, a sensor, a server, a database, an HMI, a motor, another piece of equipment that may be used in connection with an associated industrial process (or subprocess) or application of the industrial system 100, or the like.

Figure 2:
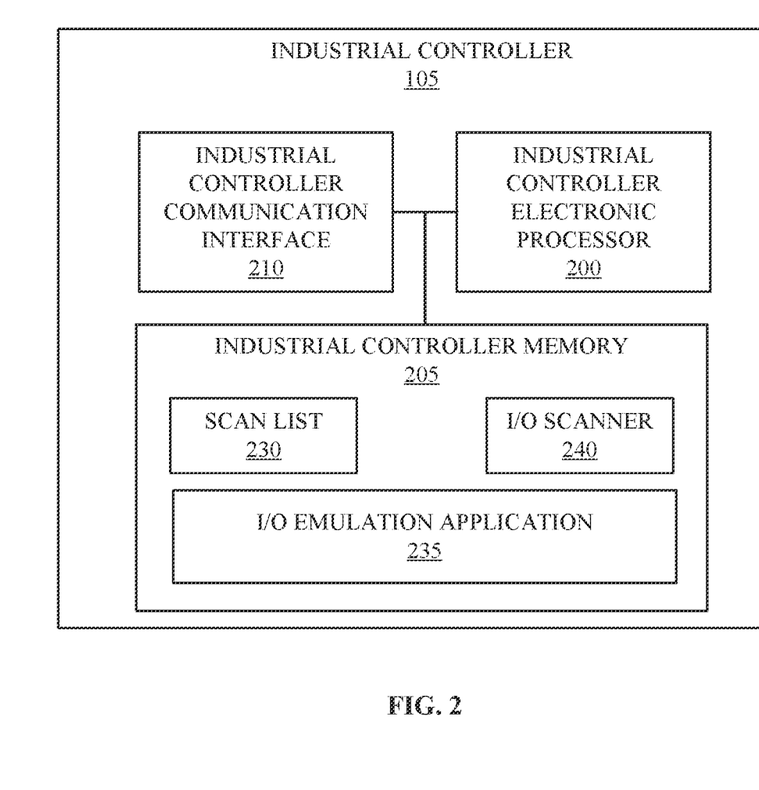
FIG. 2 schematically illustrates an example industrial controller of the system of FIG. 1 according to some configurations.

The industrial controller 105 may include a programmable logic controller ("PLC"), another type of industrial controller, or the like. FIG. 2 illustrates an example industrial controller 105 according to some configurations. In the illustrated example of FIG. 2, the industrial controller 105 includes an industrial controller electronic processor 200, an industrial controller memory 205, and an industrial controller communication interface 210. The industrial controller electronic processor 200, the industrial controller memory 205, and the industrial controller communication interface 210 communicate over one or more communication lines or buses. The industrial controller 105 may include additional, fewer, or different components than those illustrated in FIG. 2 in various configurations. The industrial controller 105 may also perform additional functionality other than the functionality described herein.

In some configurations, the industrial controller communication interface 210 enables the industrial controller 105 to communicate with one or more of the industrial devices 110 over the communication network 130 (e.g., a CAN bus). The industrial controller electronic processor 200 includes a microprocessor, an application-specific integrated circuit ("ASIC"), a system-on-chip ("SOC"), a system-on-module ("SOM"), a field-programable gate array ("FPGA"), or another suitable electronic device for processing data, and the industrial controller memory 205 may include a non-transitory, computer-readable storage medium. The industrial controller electronic processor 200 is configured to retrieve instructions and data from the industrial controller memory 205 and execute the instructions.

As one example, as illustrated in FIG. 2, the industrial controller memory 205 includes an I/O emulation application 235. The I/O emulation application 235 is a software application executable by the industrial controller electronic processor 200 in the example illustrated and as specifically discussed below, although a similarly purposed module can be implemented in other ways in other examples. In some configurations, the I/O emulation application 235 may be firmware. For instance, the I/O emulation application 235 may be firmware running in the background of the industrial controller 105. The industrial controller electronic processor 200 may execute the I/O emulation application 235 to facilitate I/O device emulation, and, more specifically, in some examples, to facilitate the automated setup of the I/O device emulation, as described in greater detail herein. In some examples, the industrial controller electronic processor 200 may execute the I/O emulation application 235 to match an I/O device to a scan list entry, as described in greater detail herein. Alternatively, or in addition, in some examples, the industrial controller electronic processor 200 may execute the I/O emulation application 235 to generate a scan list entry (or morph the scan list) for an I/O device, as described in greater detail herein As also illustrated in FIG. 2, in some configurations, the industrial controller memory 205 includes a scan list 230 and an I/O scanner 240. The I/O scanner 240 may be a software application executable by the industrial controller electronic processor 200 in the example illustrated and as specifically discussed below, although a similarly purposed module can be implemented in other ways in other examples. The industrial controller electronic processor 200 may execute the I/O scanner 240 to establish or manage communication (or communication connections) within the industrial system 100. In some examples, the industrial controller electronic processor 200 may execute the I/O scanner 240 to (automatically) map a network of devices (e.g., the industrial devices 110) into a scan list (e.g., the scan list 230). For instance, the I/O scanner 240 (when executed by the industrial controller electronic processor 200) may be configured to set up, establish, or otherwise provide communication, terminal connections, or connection paths between components of an industrial system (e.g., the industrial system 100). In some configurations, the I/O scanner 240 may be, e.g., an EtherNet/IP scanner, a remote I/O scanner, etc. In some configurations, the industrial controller electronic processor 200 may execute the I/O scanner 240 as part of generating or maintaining the scan list 230, performing electronic keying between one or more components of the industrial system 100, facilitating the commissioning of a new or replacement I/O device within the industrial system 100, facilitating I/O device emulation for an I/O device within the industrial system 100, etc.

Figure 3:
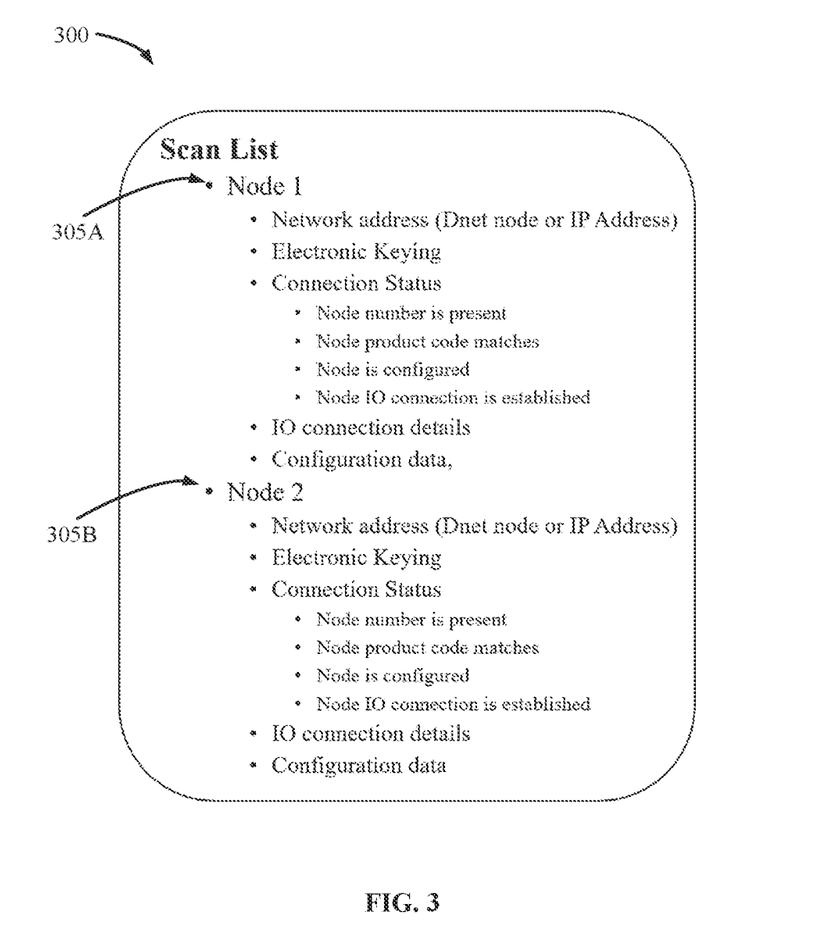
FIG. 3 schematically illustrates an example scan list for an industrial system according to some configurations.

As noted above, in some examples, the industrial controller 240 may generate the scan list 230 via execution of the I/O scanner 240. The scan list 230 may be a mapping of networked devices within the industrial system 100 (e.g., a mapping of the industrial devices 110). Accordingly, in some examples, the scan list 230 may include a list of industrial devices (as nodes) with which the I/O scanner 240 is configured to exchange I/O data with. For example, FIG. 3 illustrates an example scan list 300. As illustrated in FIG. 3, the scan list 300 may include a first node 305A (represented in FIG. 3 as "Node 1") and a second node 305B (represented in FIG. 3 as "Node 2"). The first node 305A may represent the first industrial device 110A of FIG. 1 and the second node 305B may represent the second industrial device 110B of FIG. 1. In the illustrated example, the scan list 230 may include details or information associated with each node. For example, the scan list 230 may include logic and data. The logic may be used to open an I/O connection, monitor the I/O connection, etc. For the logic to open the I/O connect, the logic has procedures to check (or verify) the electronic keying, send the configuration data, verify I/O connection size, etc. Such details may be included in the scan list 230 (e.g., including information associated with a network address, electronic keying, connection status (including, e.g., node number is present, node product code matches, node is configured, and node IO connection is established), and IO connection details, configuration data).

Figure 4:
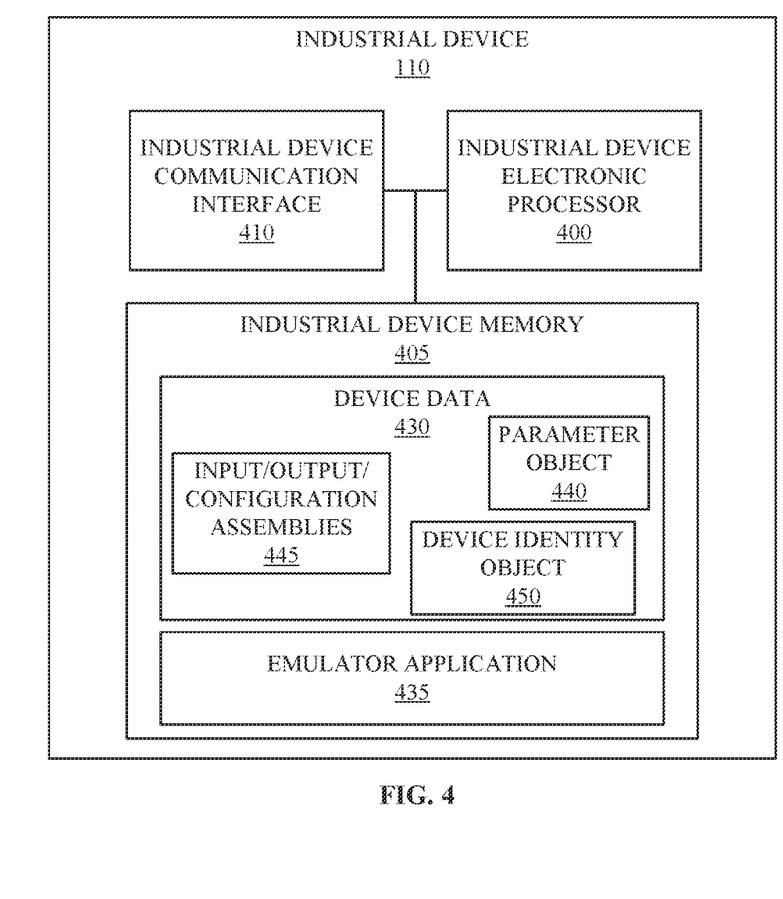
FIG. 4 schematically illustrates an example industrial device of the system of FIG. 1 according to some configurations.

FIG. 4 illustrates an example industrial device 110 according to some configurations. In the illustrated example of FIG. 4, the industrial device 110 may include an industrial device electronic processor 400, an industrial device memory 405, and an industrial device communication interface 410. The industrial device electronic processor 400, the industrial device memory 405, and the industrial device communication interface 410 communicate over one or more communication lines or buses. The industrial device 110 may include additional, fewer, or different components than those illustrated in FIG. 4 in various configurations. The industrial device 110 may also perform additional functionality other than the functionality described herein.

In some configurations, the industrial device communication interface 410 enables the industrial device 110 to communicate with the industrial controller 105, one or more of the other industrial devices 110, another component of the industrial system 100, or a combination thereof over one or more wired or wireless communication connections (including, e.g., a CAN bus). The industrial device electronic processor 400 includes a microprocessor, an ASIC, or another suitable electronic device for processing data, and the industrial device memory 405 includes a non-transitory, computer-readable storage medium. The industrial device electronic processor 400 is configured to retrieve instructions and data from the industrial device memory 405 and execute the instructions.

As one example, as illustrated in FIG. 4, the industrial device memory 405 includes device data 430 and an emulator application 435. The emulator application 435 is a software application executable by the industrial device electronic processor 400 in the example illustrated and as specifically discussed below, although a similarly purposed module can be implemented in other ways in other examples. In some examples, the industrial device electronic processor 400 executes the emulator application 435 to facilitate I/O device emulation, and, more specifically, in some examples, to facilitate the automated setup of the I/O device emulation, as described in greater detail herein. Alternatively, or in addition, in some examples, the industrial device electronic processor 200 may execute the emulator application 435 such that the industrial device 110 emulates another industrial device, such as, e.g., a predecessor or legacy industrial device.

The device data 430 may include information or data related to the industrial device 110. For example, as illustrated in FIG. 4, the device data 430 may include a parameter object 440, input/output/configuration assemblies 445, and a device identity object 450. In some configurations, the device data 430 may include additional, fewer, or different data than illustrated in FIG. 4.

Figure 5:
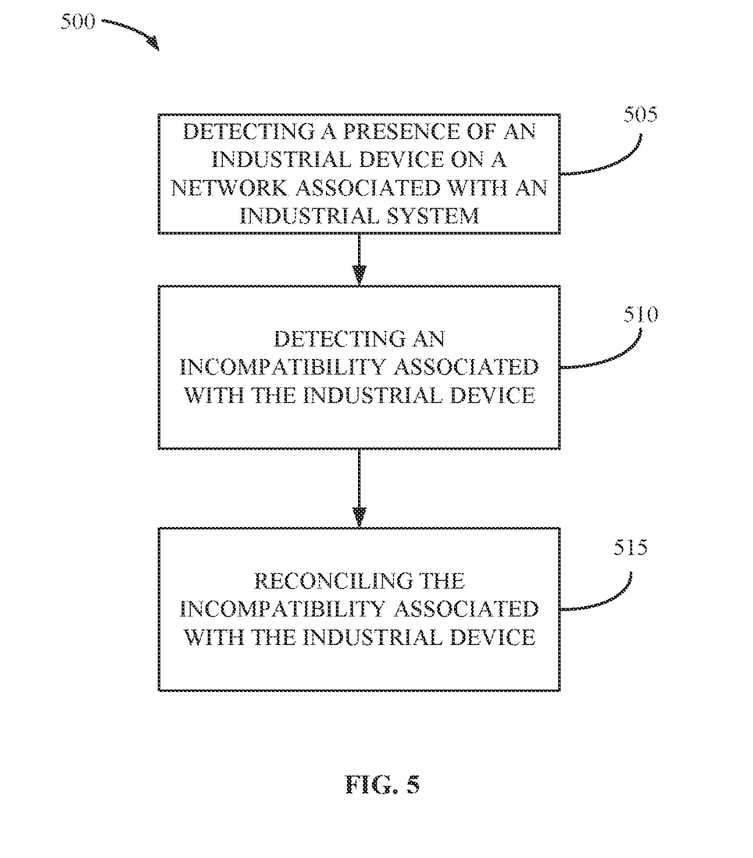
FIG. 5 is a flowchart illustrating a method for providing automated I/O device emulation for industrial systems according to some configurations.

A parameter object 440 may provide an interface to configuration data for a particular industrial device. For instance, in some configurations, the parameter object 440 may include information for defining and describing each of the individual configuration parameters for an industrial device. In some examples, the parameter object 440 may enable a device to identify a configurable parameter by, e.g., supplying a description of the parameters, including, e.g., minimum and maximum values, a human-readable text string describing the parameter, etc. The parameter object 440 may include information associated with, e.g., sensor type (e.g., a voltage sensor, a current intensity sensor, a ground fault current sensor, with, a maximum current range with a 30 amp, 60 amp, 100 amp, or 200 amp option), control module (e.g., a digital control module or an analog control module, ground fault current sensor as either an internal sensor that may be integral to a hardware assembly or an external ground fault sensor that may be electrically connected via, e.g., screws to a terminal block), expansion I/O (e.g., when the industrial device includes a local expansion bus for digital or analog modules, where the local expansion bus may also host an operator interface with buttons, indicators, etc.), operator station (e.g., an operator station for monitoring the industrial system, an operator station for controlling the industrial system, etc.), etc. FIG. 5 is a flowchart illustrating a method 500 for automated I/O device emulation according to some configurations. The method 500 is described herein as being performed by the industrial controller 105 (e.g., the industrial controller electronic processor 200). However, as noted herein, the functionality (or a portion thereof) described as being performed by the industrial controller 105 may be distributed among, and hence performed by, one or more other devices (e.g., one or more electronic processors).

As illustrated in FIG. 5, the method 500 includes detecting a presence of a replacement industrial device (e.g., the industrial device 110) on a network (e.g., the communication network 130, or a CAN bus) associated with the industrial system 100 (at block 505). The replacement industrial device may be a new or replacement industrial device for a predecessor or legacy industrial device of the industrial system 100. For example, in some instances, the industrial system 100 may include a pre-existing or legacy industrial device that is being replaced with a new industrial device (e.g., the replacement industrial device detected at block 505).

In some configurations, the replacement industrial device may be associated with a fault condition. In some examples, the fault condition may be indicative of the replacement industrial device having failed electronic keying. For example, when the replacement industrial device is included in (or added to) the industrial system 100 (e.g., added to the communication network 130 associated with the industrial system 100), an electronic keying process may be triggered or otherwise performed within the industrial system 100. In some examples, electronic keying may refer to determining whether product or device types (e.g., product codes, etc.) match (e.g., a device type associated with the replacement industrial device and a node included in the scan list 130, where that node represents a legacy industrial device being replaced by the replacement industrial device). When the product types match (e.g., electronic keying is successful), communication may be enabled (e.g., an I/O connection may be permitted or otherwise established). When the product types do not match (e.g., electronic keying is unsuccessful or failed), communication may be disabled (e.g., an I/O connection may not be permitted or established).

Accordingly, in some examples, the industrial controller electronic processor 300 may determine or detect an incompatibility (e.g., the fault condition of the replacement industrial device) (at block 510). In some examples, the industrial controller electronic processor 300 may determine whether the replacement industrial device is compatible with a legacy industrial device being replaced by the replacement industrial device. The industrial controller electronic processor 300 may determine or detect the incompatibility using the scan list 230 (e.g., a list or map of industrial devices included in the industrial system 100). For instance, the industrial controller electronic processor 300 may detect an incompatibility between the replacement industrial device and the scan list 230. In some examples, the industrial controller electronic processor 300 may determine whether a device type or identity of the replacement industrial device matches one or more predecessor industrial devices as represented as nodes in the scan list 230. For instance, each node in the scan list 230 may represented a predecessor or current industrial device included in the industrial system 100.

In some examples, the industrial controller electronic processor 300 may compare device types of the replacement industrial device and one or more predecessor industrial devices included in the industrial system 100, such as, e.g., the predecessor or legacy industrial device being replaced by the replacement industrial device. In some examples, the industrial controller electronic processor 300 may determine a device type or identify of the replacement industrial device. In some examples, the industrial controller electronic processor 300 may determine the device type or identity of the replacement industrial device based on device data (e.g., the device data 430 of FIG. 4) for the replacement industrial device. Accordingly, the industrial controller electronic processor 300 may access (or request) device data (e.g., the device data 430 of FIG. 4) from the replacement industrial device, which may include, e.g., a device type or identity (e.g., a product code or other identifier).

The industrial controller electronic processor 300 may also determine a device type or identity of the predecessor industrial device being replaced by the replacement industrial device. The industrial controller electronic processor 300 may access or determine the device type or identity of the predecessor industrial device using data included in the scan list 230 (e.g., device data associated with a node of the scan list 230 representing the predecessor industrial device). The industrial controller electronic processor 300 may determine whether the device type of the replacement industrial device (e.g., a first device type of a first industrial device) matches the device type of the predecessor industrial device (e.g., a second device type of a second industrial device). When the device types match, the industrial controller electronic processor 300 may determine that there is compatibility (e.g., no fault condition). When the device types do not match, the industrial controller electronic processor 300 may determine that there is an incompatibility (e.g., a fault condition).

In some configurations, responsive to determining an incompatibility between the replacement industrial device and the predecessor industrial device (e.g., one or more nodes included in the scan list 230), the industrial controller electronic processor 300 may enable or facilitate reconciliation of the incompatibility. In some configurations, the industrial controller electronic processor 300 and the industrial device electronic processor 400 work cooperatively to enable or facilitate reconciliation of the incompatibility. In some instances, the reconciliation of the incompatibility reconciles the fault condition of the replacement industrial device. The industrial controller electronic processor 300, the industrial device electronic processor 400, or a combination thereof may enable or facilitate reconciliation of the incompatibility in order to set an emulation mode (or parameter thereof) for the replacement industrial device such that, when operating in an emulation state or mode, the replacement industrial device may emulate the predecessor industrial device being replaced by the replacement industrial device. In some instances, the industrial controller electronic processor 300, the industrial device electronic processor 400, or a combination thereof automatically reconcile the incompatibility as part of, e.g., an automated I/O device emulation setup process.

Figure 6:
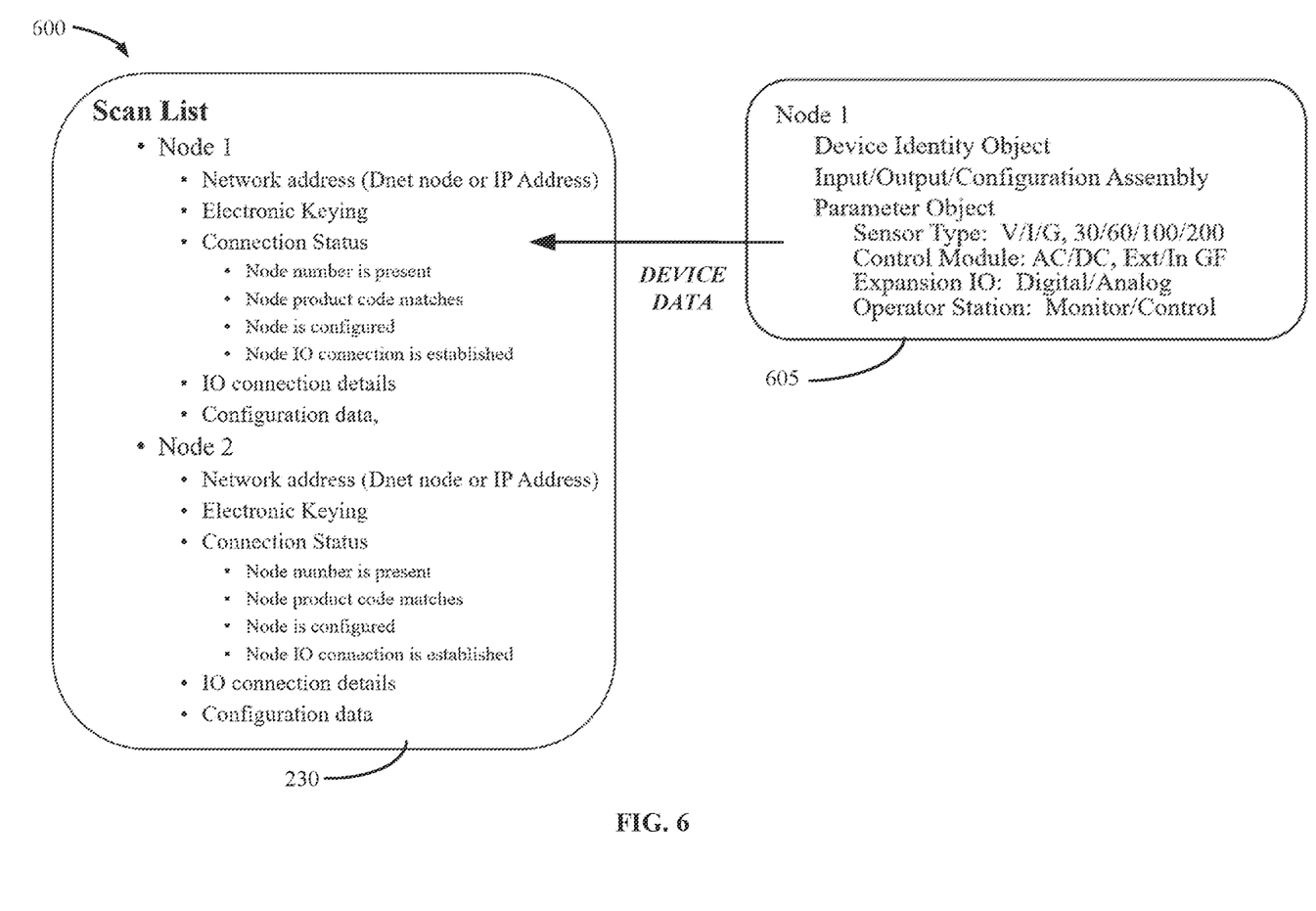
FIG. 6 illustrates an example reconciliation approach according to some configurations.

In some examples, the industrial controller electronic processor 300, the industrial device electronic processor 400, or a combination thereof may reconcile the incompatibility by morphing the scan list 230 to include a scan list entry for the replacement industrial device, as illustrated in FIG. 6. FIG. 6 illustrates an example reconciliation approach 600 that includes morphing the scan list 230 to include a scan list entry for the replacement industrial device (represented in FIG. 6 by reference numeral 605). In some examples, the example reconciliation approach 600 of FIG. 6 may be performed as part of block 510 of FIG. 5.

In such instances, the industrial controller electronic processor 300 may access device data associated with the replacement industrial device (e.g., the device data 430 of FIG. 4). For example, the industrial controller electronic processor 300 may transmit, to the replacement industrial device, a message requesting device data for the replacement industrial device (e.g., the device data 430 of FIG. 4). The requested device data may include a device type or identity of the replacement device. In response to receiving the message, the replacement industrial device (e.g., the industrial device electronic processor 400) may access the device data 430 and generate and transmit a response to the industrial controller electronic processor 300, where the response may include the device data 430 of the replacement device (including a device type or identity of the replacement industrial device). The industrial controller electronic processor 300 may receive the response from the industrial device electronic processor 400. In response to receiving the device data 430 for the replacement industrial device, the industrial controller electronic processor 300 may generate a scan list entry (e.g., as a new scan list entry) for the replacement industrial device. The scan list entry may include the device data associated with the industrial device. The industrial controller electronic processor 300 may then add or modify the scan list 230 to include the scan list entry for the replacement industrial device.

Figure 7:
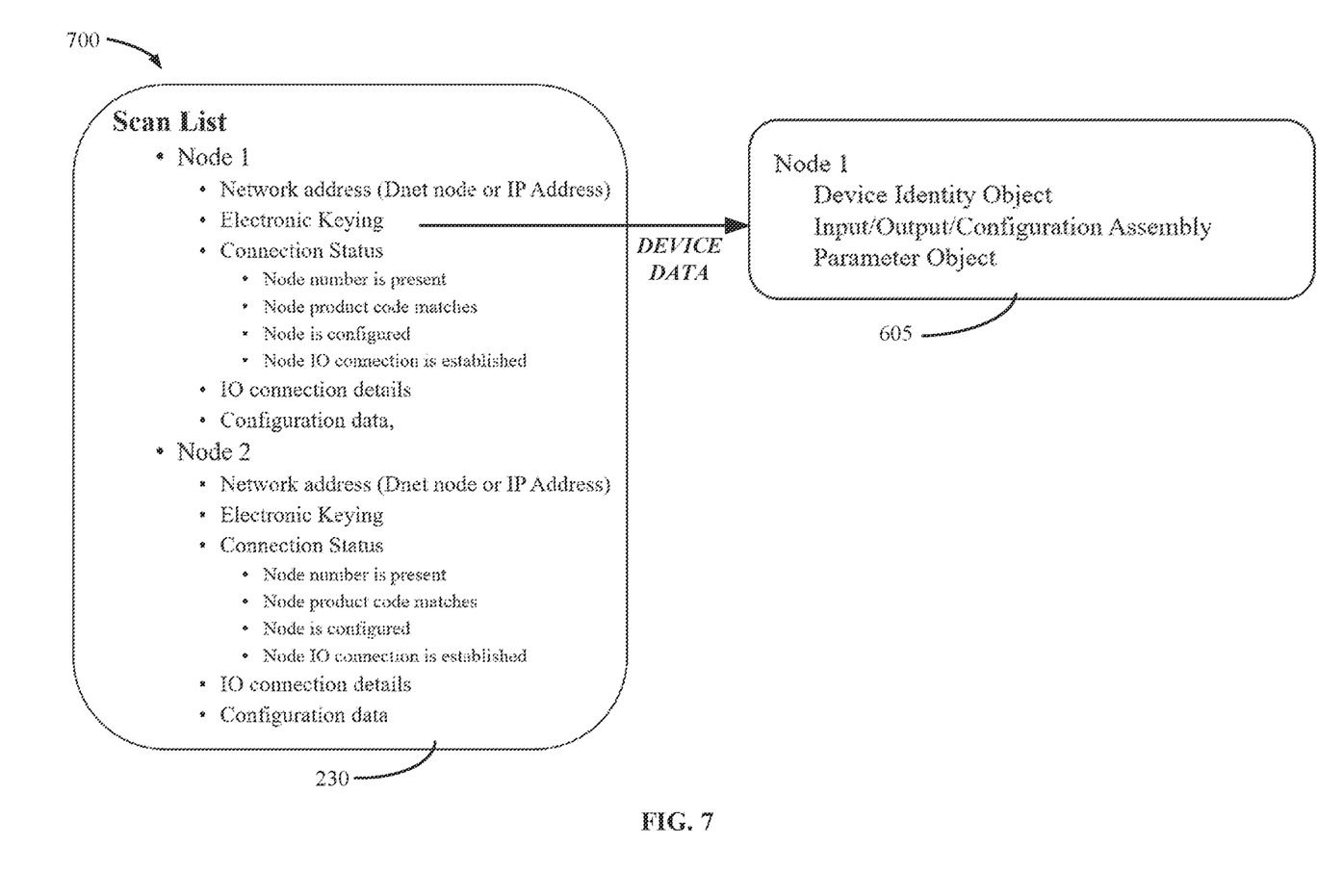
FIG. 7 illustrates another example reconciliation approach according to some configurations.

Alternatively, or in addition, in some examples, the industrial controller electronic processor 300, the industrial device electronic processor 400, or a combination thereof may reconcile the incompatibility by providing device data (e.g., electronic keying information) from the scan list 230 to the replacement industrial device (e.g., for inclusion as the device data 430 for the replacement industrial device), as illustrated in FIG. 7. FIG. 7 illustrates another example reconciliation approach 700 that includes providing information from the scan list 230 to the replacement industrial device (represented in FIG. 7 by reference numeral 605). In some examples, the example reconciliation approach 700 of FIG. 7 may be performed as part of block 510 of FIG. 5.

In such instances, the industrial controller electronic processor 300 may access device data associated with the predecessor industrial device (e.g., device data or electronic keying data associated with a node of the scan list for the predecessor industrial device). The industrial controller electronic processor 300 may transmit, to the replacement industrial device, device data associated with the predecessor industrial device. The device data may include a device type or identity of the predecessor industrial device. In response to receiving the message, the replacement industrial device (e.g., the industrial device electronic processor 400) may store or update the device data 430 based on the device data associated with the predecessor industrial device. Accordingly, an emulation mode is set for the replacement industrial device using the device data associated with the predecessor industrial device, such that when the replacement industrial device executes or reboots in the emulation mode, the replacement industrial device emulates the predecessor industrial device.

Figure 8:
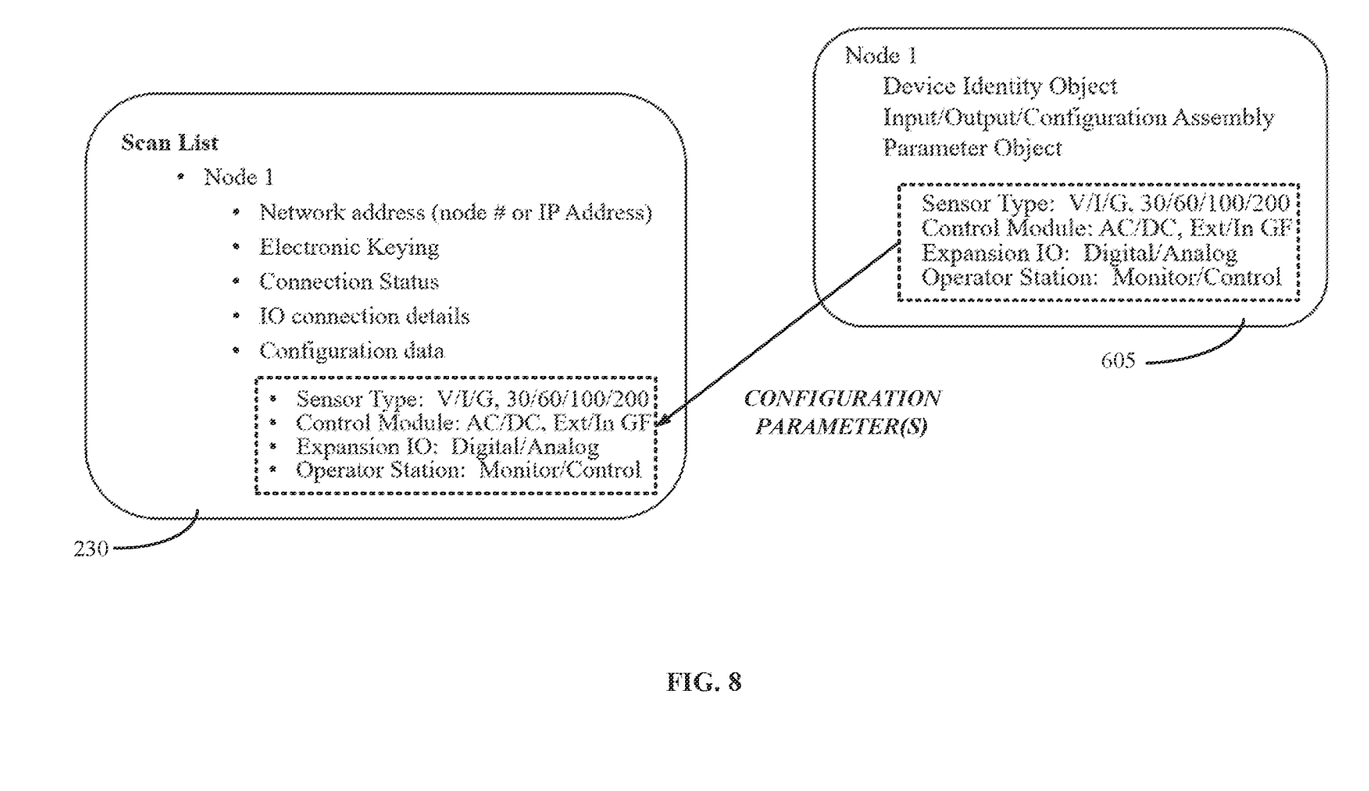
FIG. 8 illustrates transferring configuration parameter according to some configurations.

After reconciliation the incompatibility and, ultimately, setting the emulation mode for the replacement industrial device, the replacement industrial device may be controlled in accordance with the emulation mode such that the replacement industrial device emulates the predecessor or legacy industrial device (at block 515). In some configurations, the replacement industrial device may be controlled in accordance with the emulation mode by rebooting the replacement industrial device in the emulation mode (or pursuant to emulation parameters). In some examples, the rebooting of the replacement industrial device may be triggered or controlled by the industrial controller electronic processor 300. Alternatively, or in addition, while the replacement device emulates the predecessor device, an I/O connection for the replacement industrial device may be established (e.g., as a result of electronic keying be successful or passed). Alternatively, or in addition, an automatic device replacement procedure or process may be initiated. For instance, in some configurations, a set of configuration parameters may be transferred via the I/O connection established for the replacement industrial device such that the replacement industrial device ultimately replaces the predecessor or legacy industrial device in the industrial system 100, as illustrated in FIG. 8.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

What is claimed is:

1. A system providing automated input/output (I/O) device emulation for industrial systems, the system comprising:
   one or more electronic processors configured to:
   detect a presence of an industrial device of an industrial system;
   detect an incompatibility between the industrial device and a list of industrial devices included in the industrial system;
   access device data from the list of industrial devices included in the industrial system;
   transmit the device data to the industrial device for setting an emulation mode for the industrial device to reconcile the incompatibility between the industrial device and the list of industrial devices included in the industrial system to set an emulation mode for the industrial device; and
   control the industrial device to execute in the emulation mode such that, when the industrial device is rebooted in accordance with executes in the emulation mode, functionality of the industrial device emulates functionality of another industrial device included in the list of industrial devices included in the industrial system, wherein the other industrial device is associated with the device data accessed from the list of industrial devices included in the industrial system.

2. The system of claim 1, wherein the one or more electronic processors are configured to detect the incompatibility between the industrial device and the list by:

determining a device type for the industrial device; and
determining whether the device type for the industrial device is included in the list.

3. The system of claim 2, wherein the one or more electronic processors are configured to detect the incompatibility between the industrial device and the list when the device type for the industrial device is not included in the list.

4. The system of claim 2, wherein the device type includes a product code.

5. The system of claim 1, wherein the one or more electronic processors are configured to reconcile the incompatibility between the industrial device and the list by:
accessing device data associated with the industrial device;
generating an entry for the industrial device, the entry including the device data associated with the industrial device; and
modifying the list to include the entry for the industrial device.

6. The system of claim 1, wherein the one or more electronic processors are configured to:
establish an I/O connection for the industrial device while in the emulation mode; and
transfer a set of configuration parameters associated with the industrial device via the I/O connection.

7. The system of claim 1, wherein the list is a scan list for the industrial system, the scan list providing a mapping of each industrial device included in the industrial system.

8. The system of claim 1, wherein the one or more electronic processors are configured to control the industrial device to execute in the emulation mode by rebooting the industrial device in the emulation mode.

9. A method for providing automated input/output (I/O) device emulation for an industrial system, the method comprising:
determining, with one or more electronic processors, whether a first industrial device is compatible with a second industrial device represented by a node of a scan list for the industrial system;
responsive to determining an incompatibility between the first industrial device and the second industrial device, reconciling, with the one or more electronic processors, the incompatibility between the first industrial device and the second industrial device to set an emulation mode for the first industrial device by:
accessing device data associated with the first industrial device;
generating a scan list entry for the first industrial device, the scan list entry including the device data associated with the first industrial device; and
updating the scan list to include the scan list entry for the first industrial device; and
controlling the first industrial device to execute in the emulation mode such that, when the industrial device executes in the emulation mode, the first industrial device mimics functionality of the second industrial device, wherein the second industrial device is a pre-existing industrial device included in the industrial system.

10. The method of claim 9, wherein determining whether the first industrial device is compatible with the second industrial device includes:
accessing, from the first industrial device, device data for the first industrial device;
determining, based on the device data, a first device type of the first industrial device; and
comparing the first device type for the first industrial device to a second device type for the second industrial device,
wherein the incompatibility is determined when the first device type for the first industrial device is different from the second device type for the second industrial device.

11. The method of claim 9, wherein reconciling the incompatibility between the first industrial device and the second industrial devices includes automatically reconciling the incompatibility.

12. The method of claim 9, wherein reconciling the incompatibility between the first industrial device and the second industrial devices includes:
accessing, from the scan list, device data associated with the second industrial device; and
transmitting the device data to the first industrial device for setting the emulation mode.

13. The method of claim 12, wherein controlling the first industrial device in accordance with the emulation mode includes:
rebooting the first industrial device in the emulation mode such that the first industrial device emulates the second industrial device using the device data associated with the second industrial device.

14. The method of claim 9, further comprising:
establishing an I/O connection for the first industrial device while the first industrial device emulates the second industrial device in accordance with the emulation mode; and
transferring, via the I/O connection, a set of configuration parameters to the first industrial device such that the first industrial device replaces the second industrial device in the industrial system, wherein the first industrial device mimics functionality of the second industrial device using the set of configuration parameters.

15. A system for providing automated I/O device emulation within an industrial system, the system comprising:
one or more electronic processors configured to:
detect a presence of an industrial device on a network associated with the industrial system;
responsive to an incompatibility between the industrial device and a scan list for the industrial system:
transmit, to the industrial device, a message requesting device data for the industrial device, the device data including a device type of the industrial device;
receive, from the industrial device, a response to the message, the response including the device data;
generate a scan list entry for the industrial device using the device data; and
update the scan list to include the scan list entry for the industrial device;
after updating the scan list to include the scan list entry for the industrial device:
establish an I/O connection for the industrial device; and
transmit configuration parameters to the industrial device via the I/O connection such that the industrial device replaces the other industrial device, wherein the other industrial device is a legacy industrial device of the industrial system; and
reboot the industrial device into an emulation mode based on the scan list as updated, wherein, when rebooted into the emulation mode, the industrial device emulates functionality of another industrial device associated with the industrial system.

16. The system of claim 15, wherein the industrial device is associated with a fault condition and wherein updating the scan list to include the scan list entry for the industrial device reconciles the fault condition.

17. The system of claim 16, wherein the fault condition is associated with the incompatibility between the industrial device and the scan list for the industrial system.

* * * * *